(12) United States Patent
Lu et al.

(10) Patent No.: US 6,696,510 B2
(45) Date of Patent: Feb. 24, 2004

(54) STABILIZED RESIN COMPOSITIONS

(75) Inventors: Mengshi Lu, Hillsborough, NJ (US); Michael Golder, Allendale, NJ (US)

(73) Assignee: Ticona LLC, Summit, NJ (US)

( * ) Notice: Subject to any disclaimer, the term of this patent is extended or adjusted under 35 U.S.C. 154(b) by 0 days.

(21) Appl. No.: 10/015,916

(22) Filed: Dec. 10, 2001

(65) Prior Publication Data

US 2003/0149144 A1 Aug. 7, 2003

(51) Int. Cl.[7] ............................ C08K 3/22; C08K 5/526
(52) U.S. Cl. ............................... 524/148; 524/409
(58) Field of Search ................................ 524/148, 109

(56) References Cited

U.S. PATENT DOCUMENTS

| | | | |
|---|---|---|---|
| 3,047,539 A | 7/1962 | Pengilly | 528/285 |
| 3,755,610 A | 8/1973 | McTigue | 174/23 |
| 4,185,004 A | 1/1980 | Mathis | 529/101 |
| 4,261,880 A | 4/1981 | Fujii et al. | 524/127 |
| 4,401,804 A | 8/1983 | Wooten et al. | 528/272 |
| 4,677,150 A | 6/1987 | Chacko et al. | 524/449 |
| 4,786,692 A | 11/1988 | Allen et al. | 525/439 |
| 5,254,610 A | 10/1993 | Small, Jr. et al. | 524/120 |
| 5,302,645 A | 4/1994 | Nakano et al. | 524/120 |
| 5,322,871 A | 6/1994 | Pitteloud et al. | 524/151 |

OTHER PUBLICATIONS

Technical Bulletin, Clariant Corporation, Hostanox OSP 1, pp. 1–4.

*Primary Examiner*—Peter Szekely
(74) *Attorney, Agent, or Firm*—Karen E. Klumas

(57) ABSTRACT

Stabilized polyester compositions comprising:
- (A) a thermoplastic polyester;
- (B) antimony trioxide; and
- (C) a thiobisphenol phosphite comprising at least one stearically hindered tris[(hydroxyphenylthio)phenyl] phosphite.

22 Claims, No Drawings

STABILIZED RESIN COMPOSITIONS

BACKGROUND OF THE INVENTION

1. Field of the Invention

The field of art to which this invention relates is stabilized resin compositions, more particularly, to stabilized thermoplastic polyester compositions that contain antimony trioxide.

2. Description of the Prior Art

A variety of organophosphites, including for example, pentaerythritol phosphites as well as alkyl-, aryl-, arylalkyl- and alkylarylphosphites have been proposed as additives for thermoplastic polyesters and other polymers. These organophosphites (herein referred to as "conventional organophosphites") generally function as secondary antioxidants and improve thermal-oxidative stability by scavenging hydroperoxides, the decomposition products of which otherwise attack and degrade polymer chains. Many of the conventional organophosphites are also known to function as transesterification inhibitors and, as such, are common additives to compositions containing a thermoplastic polyester and one or more thermoplastic polymers with which it can transesterify, e.g., other polyesters, polycarbonates, polyestercarbonates, and the like.

In the presence of moisture, the conventional organophosphites hydrolyze to an acid form that, in turn, attacks and degrades polymer chains. The acid form of the hydrolyzed phosphite is desirable in terms of promoting transesterification resistance, however, when antimony trioxide is present, the acid form of the hydrolyzed organophosphite can react with antimony trioxide producing what is believed to be a form of elemental antimony. This reduced form of antimony trioxide is gray in color. Thus, in the presence antimony trioxide, hydrolyzed organophosphites can undesirably darken a polymer's color, giving rise to problems with color uniformity, lot-to-lot color consistency, color matching, and the like. Hydrolyzed organophosphites may cause resin discoloration problems when even very low levels, i.e., catalytic amounts, of antimony trioxide are present.

The discoloration caused by many conventional organophosphites has limited their use in compositions in which antimony trioxide is present. Additionally, the hydrolysis products of many organophosphites, for example, stearyl alcohol in the case of distearyl pentaerythritol diphosphites, have been observed to impart a hazy or foggy appearance to thermoplastic polyester compositions, particularly when materials containing residual soaps, e.g., certain composite interpolymers, are present. Although reduced fogging may be achieved by lowering the level of hydrolysis-prone organophosphites, lower levels of such additives may not be sufficient to consistently provide effective transesterification inhibition and/or thermal-oxidative stability.

It is an object of this invention to provide effective thermal-oxidative stability to antimony trioxide-containing thermoplastic polyester compositions while minimizing discoloration and darkening attributable to the reduction of the antimony trioxide in molded parts made from same. It is a further object of this invention to provide effective transesterification resistance to compositions containing a thermoplastic polyester, one or more polymers with which it can transesterify, and antimony trioxide, while minimizing discoloration and darkening attributable to the reduction of antimony trioxide in molded parts made from same. It is a further object of this invention to provide an organophosphite that does not impart a hazy or foggy appearance to thermoplastic polyester compositions.

SUMMARY OF THE INVENTION

It has now been found that thiobisphenol phosphites of the type known as metal deactivators for polyolefins are effective thermal-oxidative stabilizers in antimony trioxide-containing thermoplastic polyester compositions. It has also been found that darkening and discoloration attributable to the reduction of antimony trioxide is minimized when such thiobisphenol phosphites are used in place of conventional organophosphites. These thiobisphenol phosphites have been found to be effective in inhibiting transesterification in compositions containing a thermoplastic polyester and one or more additional polymers with which it can transesterify. Additionally, such thiobisphenol phosphites do not impart a surface haze or fogging to thermoplastic polyester compositions.

In one embodiment this invention relates to a composition comprising:
(A) a thermoplastic polyester;
(B) antimony trioxide; and
(C) a thiobisphenol phosphite comprising at least one stearically hindered tris[(hydroxyphenylthio)phenyl] phosphite.

In another embodiment this invention relates to a composition comprising:
(A) a first polymer that is a thermoplastic polyester;
(B) a second polymer that can transesterify with said first polymer;
(C) antimony trioxide; and
(D) a thiobisphenol phosphite comprising at least one stearically hindered tris[(hydroxyphenylthio)phenyl] phosphite.

DESCRIPTION OF THE INVENTION

The thermoplastic polyesters useful in the subject compositions comprise one or more thermoplastic polymers that are the reaction product of an aromatic dicarboxylic acid and an aliphatic and/or cycloaliphatic diol. The aromatic dicarboxylic acids useful in the preparation of such thermoplastic polyesters include terephthalic acid, isophthalic acid, naphthalene dicarboxylic acid, diphenyldicarboxylic acid, and the like. As used herein the term "dicarboxylic acid" is intended to include the condensation polymerization equivalents of dicarboxylic acids, i.e., their esters or ester forming derivatives, such as acid chlorides, anhydrides, or other derivatives which behave substantially like dicarboxylic acids in a polymerization reaction with a diol. Optionally, the aromatic dicarboxylic acids are ring substituted with one or more substituent groups which do not interfere with polyester production such as, for example, $C_1$–$C_{10}$ alkyl and alkyoxy groups, as well as aryl and halo groups. In one embodiment of interest, at least 80 mole percent of the aromatic dicarboxylic acid will comprise terephthalic acid or its corresponding dialkyl ester, e.g., dimethyl terephathalic acid.

The diols from which the thermoplastic polyesters are derived contain at least two carbon atoms. Such diols include, for example, ethylene glycol, propylene glycol, 1,4-butanediol, 1,4-butenediol, 1,6-hexamethylene glycol, 1,6-dihydroxycyclohexane, diethylene glycol, triethylene glycol, and the like, and mixtures thereof. The diols can also include polymeric glycols. Equivalent ester-forming derivatives of the diols, e.g., ethylene oxide or propylene oxide or propylene carbonate, are also useful, and the term "diol" is herein understood to include same. Optionally, the diols are substituted with one or more substituent groups that do not interfere with polyester production. In the practice of this invention $C_2$ to $C_{15}$ diols are of particular interest. Preferred diols are ethylene glycol, 1,4-butane diol, and 1,6-hexamethylene glycol.

Preferred thermoplastic polyesters are poly(alkylene terephthalate)s, with poly(ethylene terephthalate) and poly(butylene terephthalate) being of particular interest. If branching is desired, the thermoplastic polyester may contain minor amounts of units derived from a branching agent such as, for example, trimethylol propane, pentaerythritol, trimethyl trimellitate, and the like.

The thermoplastic polyester used herein typically have molecular weights of from about 10,000 to about 100,000, with thermoplastic polyesters having molecular weights of from about 20,000 to about 50,000 being representative of polymers suitable for use in typical injection molding applications.

The thermoplastic polyesters are produced by conventional polymerization techniques such as are described, for example, in U.S. Pat. Nos. 2,465,319 and 3,047,539, which are incorporated herein by reference. Thermoplastic polyesters are available from a variety of sources including G.E. Plastics and Ticona, the engineering resins business of Celanese AG.

Antimony trioxide may be present in the subject compositions for one or more reasons. For example, it may be present as a flame retardant additive, as residual catalyst in the thermoplastic polyester, and/or as a component of other materials commonly found in thermoplastic polyester compositions. The amount of antimony trioxide that may be present varies depending upon its source and the purpose for which it is added. When used as a flame retardant additive, antimony trioxide is generally present in an amount up to about 10% by weight, more typically from about 2 to about 5% by weight, based on the total weight of the composition; when present as residual catalyst, antimony trioxide is generally present in an amount up to about 1% by weight, more typically, from about 0.01 to about 0.5% by weight, based on the total weight of the composition. Antimony trioxide is commercially available from a number of sources including Great Lakes Chemicals.

The thiobisphenol phosphites used in the practice of this invention comprise at least one stearically hindered tris[(hydroxyphenylthio)phenyl]phosphite. Exemplary of such stearically hindered tris[(hydroxyphenylthio)phenyl] phosphites are compounds of the formula:

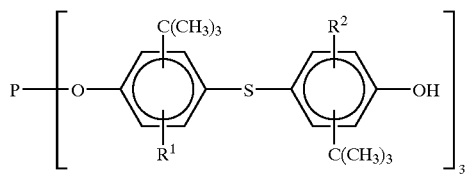

wherein $R_1$ and $R_2$ are independently selected from $C_1$ to $C_6$ alkyl. Of particular interest are thiobisphenol phosphites are of the formula:

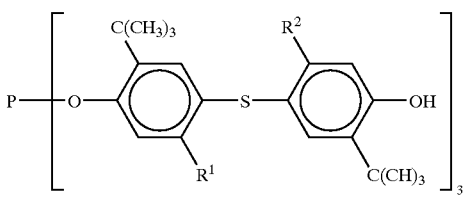

wherein $R^1$ and $R^2$ are independently $C_1$ to $C_6$ alkyl, preferably methyl. Included among the suitable thiobisphenol phosphites is tris[2-tert-butyl-4-thio-(2'-methyl-4'-hydroxy-5'-tert-butyl)-phenyl-5-methyl]-phenyl phosphite. This material is commercially available from Clariant Corporation under the tradename ®HOSTANOX OSP 1. ®HOSTANOX OSP1 is reported to have a softening point of 115±9° C. (ASTM E 28) and is supplied in granular form.

The thiobisphenol phosphites are produced by processes well known in the art that include the reaction of phosphorous trichloride with a hindered thiobisphenol. Preparative techniques for a representative hindered thiobisphenol are disclosed, for example, in UK Patent Application GB 2120656A, incorporated herein by reference.

The thiobisphenol phosphite is typically present in the subject compositions in an amount up to about 5% by weight, based on the total weight of the composition, with compositions containing from about 0.5 to about 2% by weight of thiobisphenol phosphite, based on the total weight of the composition, being of particular interest.

Compositions containing a thermoplastic polyester and a second polymer with which it can transesterify are included within the scope of this invention. Polymers that can transesterify with thermoplastic polyesters include other thermoplastic polyesters, polycarbonates and polyestercarbonates. The polycarbonates and polyestercarbonates commonly used in thermoplastic polyester/polycarbonate blends comprise one or more polymers having melt indices of from about 2 to about 80 g/min. as measured by ASTM method D1238 at 300° C. under a load of 1200 g.

The polycarbonates are ordinarily prepared by reaction of a dihydric phenol with a carbonate precursor; the polyester carbonates are ordinarily prepared by the reaction of a dihydric phenol, a carbonate precursor and an aromatic dicarboxylic acid. Exemplary of the dihydric phenols from which the polycarbonates and polyestercarbonates are derived are the following: 2,2-bis(4-hydroxyphenyl)propane (commonly referred to as bisphenol A); bis(4-hydroxyphenyl)methane; 2,2-bis(4-hydroxy-3-methylphenyl)propane; 4,4-bis(4-hydroxyphenyl) heptane; 2,2-(3,5,3',5'-tetrachloro-4,4'-dihydroxyphenyl)propane; 2,2-(3,5,3',5'-tetrabromo-4,4'-dihydroxydiphenyl)propane; and the like. Among the suitable carbonate precursors are carbonyl halides, carbonate esters and haloformates such as, for example, phosgene, diphenyl carbonate, di(tolyl) carbonate, bis-haloformates of dihydric phenols, and the like. The aromatic dicarboxylic acids from which the polyester carbonates are derived include, for example, terephthalic acid isophthalic acid, and the like, as well as the ester-forming derivatives thereof.

Polycarbonates of particular interest are the reaction product of bisphenol A and a carbonate precursor, preferably, phosgene. Polyester carbonates of particular interest are the reaction product of bisphenol A, a carbonate precursor, terephthalic acid, and isophthalic acid, with phosgene being exemplary of a preferred carbonate precursor. The preparation of aromatic polycarbonates and/or polyester carbonates is described for example in U.S. Pat. Nos. 3,169,121;

4,034,016; 4,786,692; and 4,677,150, all of which are incorporated herein by reference.

Polycarbonates and/or polyestercarbonates are commercially available from a variety of sources including Dow Chemical Company, G.E. Plastics, Bayer AG and Mitsubishi Gas Chemical.

In compositions containing a thermoplastic polyester as a first thermoplastic polymer and a second thermoplastic polymer with which it can transesterify, said second thermoplastic polymer typically accounts for up to about 90 weight percent of the composition, based on the total weight thereof. The amount of the second thermoplastic polymer depends upon the components selected and the application for which the composition is intended. Polyester/polycarbonate blends wherein the polycarbonate component is present in an amount of from about 10 to about 60 percent by weight, more particularly, from about 10 to about 40 percent by weight, based on the total weight of the composition, are of interest in many injection molding applications.

Depending upon the objects being formed and the processing techniques employed, the compositions of this invention may further comprise one or more optional additives such as, for example, nucleating agents, ultraviolet stabilizers, heat stabilizers, acid scavengers, mold release agents, lubricants, processing aids, flame retardants, pigments and the like. Other components that may be present in the compositions of this invention include, for example reinforcing agents and fillers, for example glass and carbon fibers, mineral fillers, and the like. Additionally, one or more impact modifiers including, for example, composite interpolymers, may also be present.

The compositions of this invention may also comprise additional antioxidants. Such additional antioxidants should not cause undesirable fogging of molded parts or discoloration by reaction with any antimony oxide that may be present. Thus, it is desirable to avoid or minimize the use of hydrolysis-prone organophosphites, such as for example, distearyl pentaerythritol diphosphite, tris(2,4-di-t-butylphenyl) phosphite, and the like. Stabilizers and/or antioxidants suitable for use herein include, for example, tetrakis[methylene (3,5-di-tert-butyl-4-hydroxyhydrocinnamate)] methane and 1,6-hexamethylene bis(3,5-di-t-butyl-4-hydroxy hydrocinnamate). Tetrakis[methylene (3,5-di-tert-butyl-4-hydroxyhydrocinnamate)] methane is commercially available from Ciba Specialty Chemicals under the tradename IRGANOX® 1010; 1,6-hexamethylene bis(3,5-di-t-butyl-4-hydroxy hydrocinnamate) is commercially available from Ciba Specialty Chemicals under the tradename IRGANOX® 259.

The compositions of this invention can be prepared by conventional melt blending techniques wherein the thermoplastic polyester, stabilizer and, when present, second thermoplastic polymer, impact modifier, reinforcing agent, filler and any other additional additives or components, are combined under conditions of elevated temperature and shear, with antimony trioxide being incorporated into the composition as an additive and/or by its presence in one or more of the composition components for example, as residual catalyst in the thermoplastic polyester. The order in which the components are combined is not critical; if desired, the various components can be combined in a single or multiple steps. Typically, the compositions are prepared by melt compounding of the components at melt temperatures of from about 200° C. to about 300° C., depending upon the particular components utilized and their relative amounts.

The compositions of this invention are useful in the production of a variety of molded and extruded articles.

Molded articles produced from the subject compositions may be subjected to other secondary processing steps such as, for example, painting, printing, laser marking, welding, bonding, and the like.

In an embodiment of particular interest the compositions of this invention comprise a melt blend of:
(A) from about 35 to about 55 percent by weight, based on the total weight of the composition, of poly(ethylene terephthalate) that contains antimony trioxide;
(B) from about 20 to about 45 percent by weight, based on the total weight of the composition, of an aromatic polycarbonate;
C) from about 15 to about 25 percent by weight, based on the total weight of the composition, of a composite interpolymer;
(D) from about 0.5 to about 2.0 percent by weight, based on the total weight of the composition, of a thiobisphenol phosphite of the formula:

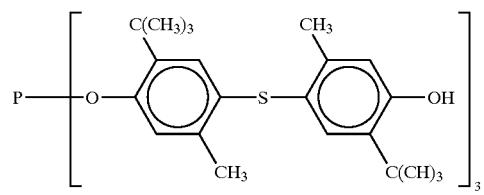

(E) optionally, up to about 1.0 percent by weight, by weight, based on the total weight of the composition, of an antioxidant that is hindered phenol,
wherein antimony trioxide is present on said melt blend in an amount up to about 1% by weight.

EXAMPLES

The following examples are presented to further illustrate this invention. The examples are not, however, intended to limit the invention in any way. The tests hereinafter described were performed on samples molded from compositions prepared in accordance with the examples. Unless otherwise indicated, all parts and percentages are by weight, based on total composition weight.

Materials referred to in the examples set forth below are as follows:

| | |
|---|---|
| PET: | Poly(ethylene terephthalate) (0.85 I.V.) prepared using an antimony trioxide catalyst |
| PC: | Calibre ® 302-22 polycarbonate from Dow Chemical Company. |
| Paraloid ® EXL-2691A: | Butadiene/methylmethacrylate/styrene composite interpolymer from Rohm & Haas Co. |
| Doverphos ® S-680: | Distearyl pentaerythritol diphosphite from Dover Chemical Corporation. |
| Irganox ® B-215 | Antioxidant blend from Ciba Specialty Chemicals, described as 1 part of tetrakis [methylene (3,5-di-tert-butyl-4-hydroxyhydrocinnamate)] methane to 2 parts tris (2,4-di-tert-butylphenyl) phosphite. |
| Irganox ® 1010 | Tetrakis [methylene (3,5-di-tert-butyl-4-hydroxyhydrocinnamate)] methane from Ciba Specialty Chemicals. |
| Hostanox ® OSP-1 | Tris [2-tert-butyl-4-thio-(2'-methyl-4'-hydroxy-5'-tert-butyl)-phenyl-5-methyl]-phenyl phosphite from Clariant Corporation. |

Compositions as described in Table 1 were compounded by mixing the components in the described proportions and melt blending the resulting mixtures on a 30 mm co-rotating twin screw extruder, the multiphase composite impact modifier and antioxidant(s) being premixed and fed to the compounding unit through a separate feeder, producing an extrudate which was cooled and pelletized. Extrusion conditions were as follows:

| | |
|---|---|
| melt temperature: | 280 to 300° C. |
| die temperature: | 285° C. |
| throughput rate: | 23 kg/hour |
| screw speed: | 200 rpm. |

The melt viscosity (M.V.) and transesterification inhibition of the various compositions is reported in Table 2. Transesterification inhibition of the compositions was evaluated based on a combination of melt stability and differential scanning calorimetry (DSC) data. M.V. and melt stability were measured using a kayeness capillary rheometer, melt stability being reported as the onset time for melt viscosity increase. DSC data provides the crystalline melting peaks ($T_m$ $1^{st}$ and $T_m$ $2^{nd}$) of the compositions and the heat of fusion associated therewith ($\Delta H_m$ $1^{st}$ and $\Delta H_m$ $2^{nd}$); $T_m$ $1^{st}$ and $\Delta H_m$ $1^{st}$ being associated with the first heat scan, and $T_m$ $2^{nd}$ and $\Delta H_m$ $2^{nd}$ being associated with the second heat scan after the sample was annealed at 265° C. for 15 minutes and then cooled to room temperature and reheated.

TABLE 1

| Component (wt. %) | $C_1$ | $C_2$ | $C_3$ | $C_4$ | $C_5$ | $E_1$ | $E_2$ |
|---|---|---|---|---|---|---|---|
| PET | 40.0 | 37.5 | 39.9 | 39.8 | 39.6 | 39.6 | 39.5 |
| PC | 39.7 | 37.2 | 39.7 | 39.7 | 39.7 | 39.5 | 39.0 |
| Paraloid ® EXL-2691A | 20.0 | 25.0 | 20.0 | 20.0 | 20.0 | 20.0 | 20.0 |
| Irganox ® B-215 | 0.3 | 0.3 | — | 0.3 | 0.3 | — | — |
| Irganox ® 1010 | — | — | 0.2 | — | — | 0.3 | 0.3 |
| Doverphos ® S-680 | — | — | 0.2 | 0.2 | 0.4 | — | — |
| Hostanox OSP-1 | — | — | — | — | — | 0.6 | 1.2 |

The compositions prepared as described above were then dried at 120° C. for 4 hours and then molded into test specimens 3.175 mm thick using a Boy 30 ton injection molding maching. Conditions during molding were as follows.

| | |
|---|---|
| melt temperature: | 285° C. |
| mold temperature: | ~50–90° C. |
| cycle time: | 60 sec |
| screw speed: | 40 rpm |

Physical properties of the molded test specimens were measured and are reported in Table 2. Tensile strength, tensile modulus and elongation (at break and yield) were measured according to ASTM method D638. Izod impact (notched) was measured pursuant to ASTM method D256. The color of the molded test specimens is also reported in Table 1, with "w" indicating a white product and "g" indicating a gray product.

Molded test specimens made from the $E_1$ and $E_2$ compositions were white in color and had good melt stability as evidenced by melt stability data and retention of the second DSC melting peak. In contrast, molded test specimens from the $C_3$ to $C_5$ compositions had an undesirable gray color.

While specimens made from the $C_1$ and $C_2$ compositions had good color, transesterification inhibition of these compositions was poor compared to the $E_1$ and $E_2$ compositions.

TABLE 2

| PROPERTIES | $C_1$ | $C_2$ | $C_3$ | $C_4$ | $C_5$ | $E_1$ | $E_2$ |
|---|---|---|---|---|---|---|---|
| MV @ 250° C. and 1000 sec$^{-1}$ (Pa sec) | 804 | 817 | 493 | 498 | 396 | 559 | 588 |
| Tensile strength @ yield (MPa) | 46.4 | 43.1 | 45.0 | 44.7 | 45.7 | 45.5 | 47.3 |
| Elongation @ yield (%) | 7.6 | 7.8 | 7.6 | 7.5 | 7.9 | 7.5 | 7.5 |
| Tensile strength @ break (MPa) | 39.8 | 38.4 | 39.9 | 38.1 | 41.4 | 43.9 | 43.5 |
| Elongation @ break (%) | 136 | 132 | 119 | 114 | 124 | 139 | 128 |
| Tensile modulus (Mpa) | 672 | 627 | 500 | 455 | 683 | 661 | 693 |
| Izod Impact, notched (J/m) | 610 | 560 | 360 | 480 | 440 | 410 | 410 |
| Color | w | w | g | g | g | w | w |
| Melt Stability (min) | 10+ | 5+ | 20+ | 20+ | 20+ | 15+ | 20+ |
| $T_m$ $1^{st}$ (° C.) | 243 | 242 | 246 | 246 | 247 | 245 | 244 |
| $\Delta H_m$ $1^{st}$ (J/g) | 20 | 20 | 24 | 27 | 25 | 23 | 23 |
| $T_m$ $2^{nd}$ (° C.) | 232 | none | 238 | 238 | 241 | 240 | 237 |
| $\Delta H_m$ $2^{nd}$ (J/g) | 3 | none | 20 | 22 | 20 | 17 | 15 |

What is claimed is:

1. A composition comprising:
   (A) a thermoplastic polyester;
   (B) antimony trioxide; and
   (C) a thiobisphenol phosphite comprising at least one stearically hindered tris[(hydroxyphenylthio)phenyl] phosphite.

2. A composition as described in claim 1 wherein said thiobisphenol phosphite is present in an amount up to about 5 percent by weight, based on the total weight of the composition.

3. A composition as described in claim 1 wherein said thiobisphenol phosphite comprises at least one compound of the formula:

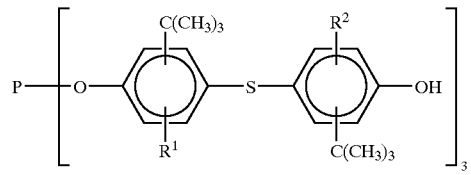

wherein $R_1$ and $R_2$ are independently selected from $C_1$ to $C_6$ alkyl.

4. A composition as described in claim 3 wherein said thiobisphenol phosphite is present in an amount of from about 0.5 to about 2 percent by weight, based on the total weight of the composition.

5. A composition as described in claim 4 wherein said thermoplastic polyester is a poly(alkylene terephthalate).

6. A composition as described in claim 5 wherein said poly(alkylene terephthalate) is selected from the group consisting of poly(ethylene terephthalate), poly(butylene terephthalate) and mixtures thereof.

7. A composition as described in claim 6 wherein said antimony trioxide is present in an amount up to about 5 percent by weight, based on the total weight of the composition.

8. A composition as described in claim 4 wherein the source of at least a portion of said antimony trioxide in the composition is residual catalyst in the thermoplastic polyester.

9. A composition as described in claim 7 wherein said thiobisphenol phosphite is a compound of the formula:

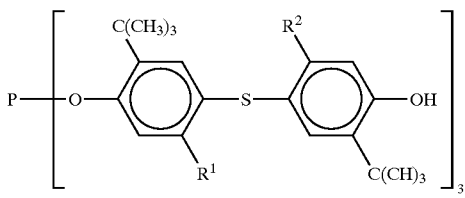

wherein $R^1$ and $R^2$ are independently $C_1$ to $C_6$ alkyl.

10. A composition as described in claim 9 wherein $R^1$ and $R^2$ are methyl.

11. A composition as described in claim 10 which further comprises an antioxidant that is a hindered phenol.

12. A composition as described in claim 11 wherein said hindered phenol is selected from the group consisting of tetrakis[methylene (3,5-di-tert-butyl-4-hydroxyhydrocinnamate)] methane and 1,6-hexamethylene bis(3, 5-di-t-butyl-4-hydroxy hydrocinnamate).

13. A composition comprising:
(A) a first polymer that is a thermoplastic polyester;
(B) a second polymer that can transesterify with said first polymer;
(C) antimony trioxide; and
(D) a thiobisphenol phosphite comprising at least one stearically hindered tris[(hydroxyphenylthio)phenyl] phosphite.

14. A composition as described in claim 13 wherein said second polymer is a thermoplastic polymer selected from the group consisting of polyesters, polycarbonates, polyester carbonates and mixtures thereof.

15. A composition as described in claim 14 wherein said second polymer is polycarbonate.

16. A composition as described in claim 15 wherein said thiobisphenol phosphite is a compound of the formula:

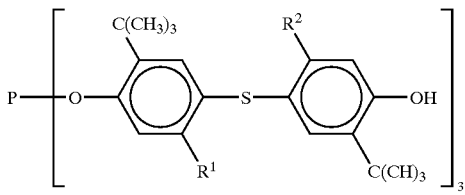

wherein $R^1$ and $R^2$ are independently $C_1$ to $C_6$ alkyl.

17. A composition as described in claim 13 wherein the source of at least a portion of said antimony trioxide in the composition is residual catalyst in the thermoplastic polyester.

18. A composition as described in claim 16 wherein $R^1$ and $R^2$ are methyl.

19. A composition as described in claim 18 wherein said first polymer is selected from the group consisting of poly(ethylene terephthalate), poly(butylene terephthalate) and mixtures thereof.

20. A composition as described in claim 15 that further comprises a composite interpolymer.

21. A composition that comprises a melt blend of:
(A) from about 35 to about 55 percent by weight, based on the total weight of the composition, of poly(ethylene terephthalate) that contains antimony trioxide;
(B) from about 20 to about 45 percent by weight, based on the total weight of the composition, of an aromatic polycarbonate;
C) from about 15 to about 25 percent by weight, based on the total weight of the composition, of a composite interpolymer;
(D) from about 0.5 to about 2.0 percent by weight, based on the total weight of the composition, of a thiobisphenol phosphite of the formula:

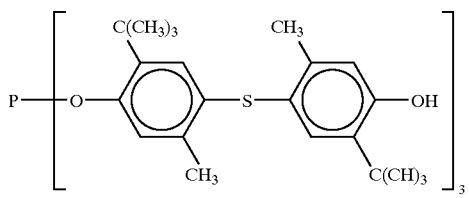

and
(E) optionally, up to about 1.0 percent by weight, by weight, based on the total weight of the composition, of an antioxidant that is a hindered phenol,
wherein antimony trioxide is present in said melt blend in an amount up to about 1% by weight.

22. A composition as described in claim 21 wherein said hindered phenol is selected from the group consisting of tetrakis[methylene (3,5-di-tert-butyl-4-hydroxyhydrocinnamate)] methane and 1,6-hexamethylene bis(3,5-di-t-butyl-4-hydroxyhydrocinnamate).

* * * * *